US010897452B2

(12) United States Patent
Kilgallon (10) Patent No.: US 10,897,452 B2
(45) Date of Patent: *Jan. 19, 2021

(54) SYSTEMS AND METHODS FOR IMPLEMENTING A PRIVACY FIREWALL

(71) Applicant: LEXISNEXIS, A DIVISION OF REED ELSEVIER INC., Miamisburg, OH (US)

(72) Inventor: William Kilgallon, Lebanon, OH (US)

(73) Assignee: RELX INC., Miamisburg, OH (US)

( * ) Notice: Subject to any disclaimer, the term of this patent is extended or adjusted under 35 U.S.C. 154(b) by 42 days.

This patent is subject to a terminal disclaimer.

(21) Appl. No.: 16/403,903

(22) Filed: May 6, 2019

(65) Prior Publication Data

US 2019/0260711 A1   Aug. 22, 2019

Related U.S. Application Data

(63) Continuation of application No. 14/877,015, filed on Oct. 7, 2015, now Pat. No. 10,333,899.

(Continued)

(51) Int. Cl.
*G06F 21/00* (2013.01)
*G06F 21/60* (2013.01)
(Continued)

(52) U.S. Cl.
CPC ...... *H04L 63/0245* (2013.01); *G06F 21/6245* (2013.01); *H04L 63/101* (2013.01)

(58) Field of Classification Search
CPC ............... H04L 63/0245; H04L 63/101; G06F 21/6245
See application file for complete search history.

(56) References Cited

U.S. PATENT DOCUMENTS 7,752,215 B2   7/2010 Dettinger et al.
8,725,714 B2   5/2014 Ai
(Continued)

FOREIGN PATENT DOCUMENTS

CN   101809570 A   8/2010
CN   103403685 A   11/2013
(Continued)

OTHER PUBLICATIONS

Hualong Sheng; Lingbo Wei; Chi Zhang; Xia Zhang; "Privacy-Preserving Cloud-Based Firewall for IaaS-based Enterprise"; 2016 International Conference on Networking and Network Applications; Year: Sep. 2016 | Conference Paper | Publisher: IEEE; pp. 206-209 (Year: 2016).*

(Continued)

*Primary Examiner* — Fatoumata Traore
*Assistant Examiner* — Courtney D Fields
(74) *Attorney, Agent, or Firm* — Dinsmore & Shohl LLP (57) ABSTRACT

Systems and methods for protecting private data behind a privacy firewall are disclosed. A system for implementing a privacy firewall to determine and provide non-private information from private electronic data includes a data storage repository, a processing device, and a non-transitory, processor-readable storage medium. The storage medium includes programming instructions that, when executed, cause the processing device to analyze a corpus of private electronic data to identify a first one or more portions of the data having non-private information and a second one or more portions of the data having private information, tag the first one or more portions of the data as allowed for use, determine whether the second one or more portions of the data includes non-private elements, and if the second one or more portions of the data comprises non-private elements, (Continued)

extract the non-private elements and tag the non-private elements as information allowed for use.

18 Claims, 8 Drawing Sheets

Related U.S. Application Data (60) Provisional application No. 62/084,656, filed on Nov. 26, 2014.

(51) Int. Cl.
*G06F 21/62* (2013.01)
*H04L 29/06* (2006.01)
*H04W 12/06* (2009.01)

(56) References Cited

U.S. PATENT DOCUMENTS

| | | | |
|---|---|---|---|
| 8,812,524 | B2 | 8/2014 | Chen et al. |
| 8,983,985 | B2 | 3/2015 | Chen et al. |
| 9,021,599 | B2 | 4/2015 | Krieger et al. |
| 2003/0097594 | A1 | 5/2003 | Penders |
| 2005/0251865 | A1* | 11/2005 | Mont .............. H04L 9/3073 726/26 |
| 2006/0123462 | A1 | 6/2006 | Lunt et al. |
| 2007/0033079 | A1 | 2/2007 | Rits et al. |
| 2008/0081641 | A1* | 4/2008 | Smith .............. G08G 1/096775 455/456.3 |
| 2010/0205189 | A1 | 8/2010 | Ebrahimi et al. |
| 2010/0241641 | A1 | 9/2010 | Byun et al. |
| 2013/0066893 | A1 | 3/2013 | Humprecht |
| 2013/0167192 | A1 | 6/2013 | Hickman et al. |
| 2014/0019467 | A1 | 1/2014 | Itoh et al. |
| 2014/0047551 | A1* | 2/2014 | Nagasundaram ..... G06F 21/606 726/26 |

FOREIGN PATENT DOCUMENTS

| | | | |
|---|---|---|---|
| CN | 104090924 A | 10/2014 | |
| JP | 2001325249 A | 11/2001 | |
| JP | 2010079444 A | 4/2010 | |
| JP | 2013161103 A | 8/2013 | |
| WO | WO-2011072289 A2 * | 6/2011 | ......... H04L 63/0218 |

OTHER PUBLICATIONS

Japanese Office Action in Japanese Application No. 2017-528534 dated Oct. 21, 2019. 4 pages.
Chinese Office Action in Chinese Application No. 201580064576.7 dated Nov. 18, 2019. 45 pages.
PCT International Search Report and Written Opinion of the International Searching Authority for PCT/US15/62260, dated Feb. 16, 2016, 14 pages.

* cited by examiner

SYSTEMS AND METHODS FOR IMPLEMENTING A PRIVACY FIREWALL

CROSS-REFERENCE TO RELATED APPLICATION

This application is a continuation of and claims priority to U.S. patent application Ser. No. 14/877,015, filed Oct. 7, 2015 and entitled "SYSTEMS AND METHODS FOR IMPLEMENTING A PRIVACY FIREWALL," which claims the benefit of U.S. Provisional Patent Application Ser. No. 62/084,656, entitled "SYSTEMS AND METHODS FOR DATA PRIVACY FIREWALL," filed on Nov. 26, 2014, the entire disclosure of both are hereby incorporated by reference herein.

BACKGROUND

Field

The present specification generally relates to providing a privacy firewall to secure private and sensitive data and, more particularly, to systems and methods for providing access to non-private information obtained from private and sensitive data.

Technical Background

Currently, access to private and/or sensitive data may be provided by anonymizing user activity related to the data and exposing the anonymized data for viewing and use. However, such methods may fail to effectively protect privacy, as the data can be manipulated to extract private information therefrom. Such methods may also fail because the data is anonymized to the extent that it is no longer useful.

Accordingly, a need exists for systems and methods that do not anonymize private data, but rather discover and extract non-private elements therefrom in such a way that the privacy of the data is not breached, but the information contained within the private data is useful.

SUMMARY

In one embodiment, a system for implementing a privacy firewall to determine and provide non-private information from private electronic data includes a data storage repository having a corpus of private electronic data, a processing device, and a non-transitory, processor-readable storage medium. The non-transitory, processor-readable storage medium includes one or more programming instructions that, when executed, cause the processing device to analyze the corpus of electronic data to identify a first one or more portions of the data having non-private information and a second one or more portions of the data having private information, tag the first one or more portions of the data as allowed for use outside the privacy firewall, determine whether the second one or more portions of the data includes non-private elements, and if the second one or more portions of the data comprises non-private elements, extract the non-private elements and tag the non-private elements as information allowed for use outside the privacy firewall.

In another embodiment, a method for implementing a privacy firewall to determine and provide non-private information from private electronic data includes analyzing, by a processing device, a corpus of private electronic data contained in a storage repository to identify a first one or more portions of the data comprising non-private information and a second one or more portions of the data including private information, tagging, by the processing device, the first one or more portions of the data as allowed for use outside the privacy firewall, determining, by the processing device, whether the second one or more portions of the data includes non-private elements, and if the second one or more portions of the data comprises non-private elements, extracting, by the processing device, the non-private elements and tagging, by the processing device, the non-private elements as information allowed for use outside the privacy firewall.

In yet another embodiment, a system for providing non-private information from private electronic data through a privacy firewall includes a data storage repository behind the privacy firewall, a processing device, and a non-transitory, processor-readable storage medium. The data storage repository includes a corpus of private electronic data that has been tagged as non-private information, private information not to be distributed, non-private elements of private information to be distributed, or depersonalized private information. The non-transitory, processor-readable storage medium includes one or more programming instructions that, when executed, cause the processing device to receive search string from a user outside the privacy firewall, search the data storage repository for one or more portions of the electronic data that correspond to the search string, and if the one or more portions of the electronic data contain the non-private information, the non-private elements of the private information to be distributed, or the depersonalized private information, providing a response to the search string. The search string includes a question, and the response contains information contained within the one or more portions of the electronic data contain the non-private information, the non-private elements of the private information to be distributed, or the depersonalized private information.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, wherein like structure is indicated with like reference numerals and in which:

DETAILED DESCRIPTION

Referring generally to the figures, embodiments described herein are directed to systems and methods for implementing a privacy firewall to restrict access to a corpus of private data stored on a server located within the bounds of the privacy firewall. In particular embodiments, the systems and methods described herein may generally be implemented to ensure that the private data remains secured, while still providing informational answers in response to questions submitted by one or more users, where the answers are obtained from the private data. It may generally be assumed that all data behind the privacy firewall is private data. However, certain portions of the data may actually contain non-private information. In addition, the remaining portions of the data that contain private information may also contain non-private elements. The non-private information and the non-private elements from the private information may be tagged as usable to answer the question submitted by the user while preserving the privacy of the data.

The methods and systems disclosed herein may be used, for example, in instances where an uncertainty may exist as to whether the use of data will "cross users," (i.e., whether an entity's private data will be seen or deduced by anyone other than the entity) or in cases where it is desired to provide a data repository that does not need highly controlled access. Non-limiting examples of instances where the privacy firewall may be applied include data derived from person A that will only ever effect person A and the data repository access is tightly controlled, data derived from person A that can affect person B or the data repository access is not tightly controlled, data that can be mapped to a user that performed a particular action (such as via user ID or internet protocol (IP) address), data that must adhere to a search string retention policy (e.g., data that must be removed or depersonalized within a particular time period), data that must adhere to privacy standards, and data that is lightly depersonalized (i.e., the user ID or IP address has been removed).

As used herein, the term "non-private information" refers to data that contains information to which an individual or entity would not have any expectation of privacy. The non-private information may be stored in repositories where all data stored therein is initially assumed to be private. As such, a determination may be made that the data contains non-private information. An illustrative example of non-private information as used herein is data that is very commonly used across widely disparate sources. Another illustrative example of non-private information is data that is not specifically related to a particular individual or entity. Yet another illustrative example of non-private information is data relating to search narrowing constructs from a search string, such as demographics, data source, historical intervals, geographic scope, and/or the like. Yet another illustrative example of non-private information is data relating to non-private web browsing activity, such as published information that is readily available to anyone on the Internet, publicly available electronic folders containing data, and/or the like. In some embodiments, non-private information may also be referred to as non-sensitive data. In some embodiments, a determination of whether certain data is deemed non-private may be completed by applying one or more rules.

As used herein, the term "private data" refers to data that contains information to which an individual or an entity would have an expectation of privacy. Illustrative examples of private data may include, but are not limited to, data relating to personal information for a particular individual or entity, data that can be mapped to a particular individual or entity (such as data that contains a particular user ID, IP address, or the like), data that is subject to a retention policy, data that is considered private because of a particular privacy standard, regulatory requirement, or the like (such as data deemed private by the Health Insurance Portability and Accountability Act (HIPAA) and/or the like), data that can only be derived from a particular individual, entity, or a specific groups of individuals and/or entities, complex data that could be claimed as being proprietary, data that contains information not generally known to the public, and data that would allow someone to reconstruct the information contained therein to gain further intelligence that could compromise a particular individual's or entity's privacy. In some embodiments, a determination of whether certain data is deemed private may be completed by applying one or more rules. In some embodiments, all data stored in a repository behind a privacy firewall may initially be presumed to be private data until it is analyzed to determine whether non-private information is included.

Even though the data in the repositories described herein may initially be deemed private, certain portions of the data or additional data that is derived from the private data may be categorized herein as "non-private elements" of private data. Illustrative examples of non-private elements may include, but are not limited to, data that has been depersonalized (such as data that has had personal information removed therefrom), identical data has appeared from a particular number of unique locations (such as searches that were conducted from a particular number of unique IP addresses), identical data that has appeared from a particular number of unique individuals and/or entities, non-private information stored in a private repository, and non-identifying metadata obtained from private data. The non-identifying metadata may include, but is not limited to, a geographic region of the individual or entity that generated the private data (such as a state, province, region, or territory, but no more specific than such), a time stamp indicating a date and an hour the data was generated (but not a minute or a second), certain search terms and connectors related to the private data, a market segment related to the private data, a product used to search (such as a particular web browser, search engine, or the like), and a number of hits from search results as a result of a search. The rules for identifying non-private information residing in a private repository may not completely protect user privacy if the data published is too specific. For example, if a common search string is internally published, but it also includes the source IP address of a user that completed the search, the privacy of the user may be compromised.

A spectrum of privacy may exist regarding user data. For example, at one extreme, a complete search string that includes the name of the individual conducting the search may be deemed private and/or sensitive data. At the other extreme, just because a user somewhere used the letter "e" in a search does not mean that another can never allow the letter "e" to appear in anything used and published. Between the two extremes, a middle ground may exist where data ceases to have any kind of privacy implications. For example, if 10,000 different users have entered the search term "Roe v. Wade," and then continued on to browse U.S. Supreme Court case citation 410 U.S. 113, an invasion of privacy likely does not exist if a user interface (UI) feature is provided that offers to jump directly to 410 U.S. 113 when a user begins typing in "Roe v.", even though the intelligence to do this might have been related to past actions of specific users.

Figure 1:
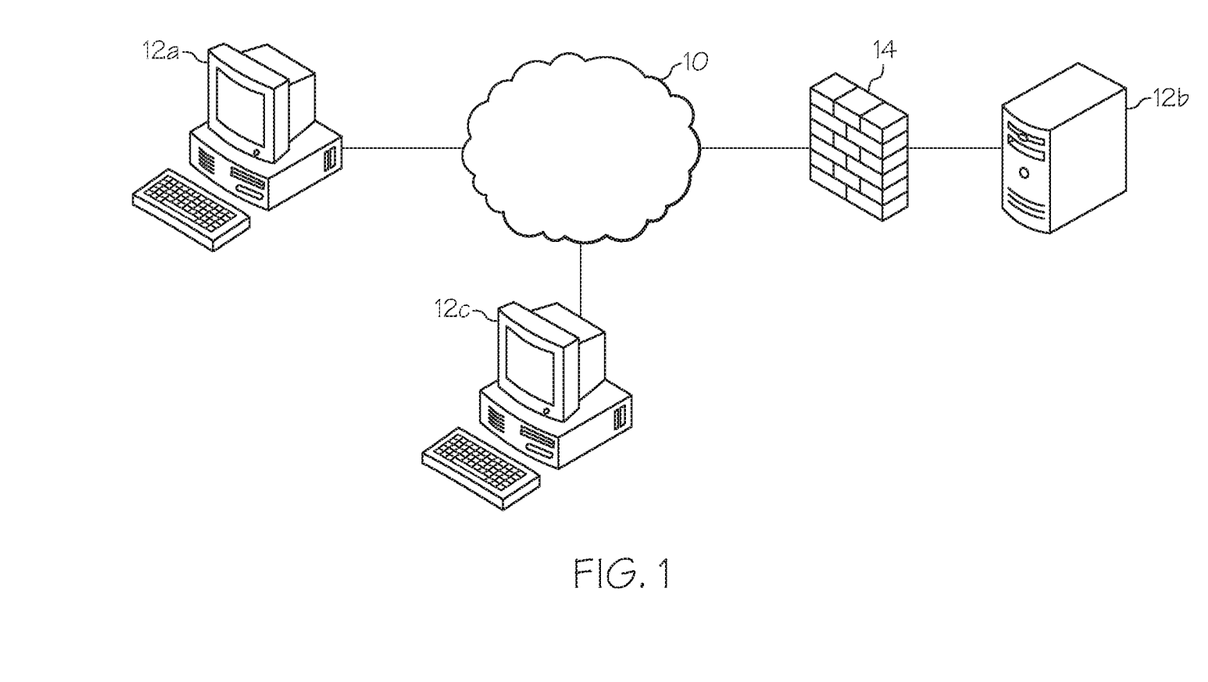
FIG. 1 depicts a schematic depiction of an illustrative computing network for a system for providing access to data behind a privacy firewall according to one or more embodiments shown and described herein.

Referring now to the drawings, FIG. 1 depicts an illustrative computing network that depicts components for a system for providing a privacy firewall that determines non-private information in a private data repository, provides responses to questions based on the non-private information, and/or auto-completes search requests based on the non-private information, according to embodiments shown and described herein. As illustrated in FIG. 1, a computer network 10 may include a wide area network (WAN), such as the Internet, a local area network (LAN), a mobile communications network, a public service telephone network (PSTN), a personal area network (PAN), a metropolitan area network (MAN), a virtual private network (VPN), and/or another network. The computer network 10 may generally be configured to electronically connect one or more computing devices and/or components thereof. Illustrative computing devices may include, but are not limited to, a user computing device 12a, a server computing device 12b, and an administrator computing device 12c.

The user computing device 12a may generally be used as an interface between the user and the other components connected to the computer network 10. Thus, the user computing device 12a may be used to perform one or more user-facing functions, such as receiving one or more inputs from a user or providing information to the user, as described in greater detail herein. Additionally, included in FIG. 1 is the administrator computing device 12c. In the event that the server computing device 12b requires oversight, updating, or correction, the administrator computing device 12c may be configured to provide the desired oversight, updating, and/or correction. The administrator computing device 12c may also be used to input additional data into the corpus stored on the server computer device 12b.

The server computing device 12b may receive data from one or more sources, store the data, and provide information from certain portions of the data to the user computing device 12a in the form of answers to questions or auto-complete suggestions when access to such information is authorized and the information is tagged as allowed for distribution. A determination of whether the information is allowed for distribution may generally be completed by a privacy firewall 14 that sits between the server computing device 12b and the computer network 10. Thus, the privacy firewall 14 (which may also be referred to as a privacy veil) may allow or deny access to certain information from the data stored at the server computing device 12b, as described in greater detail herein.

It should be understood that while the user computing device 12a and the administrator computing device 12c are depicted as personal computers and the server computing device 12b is depicted as a server, these are nonlimiting examples. More specifically, in some embodiments, any type of computing device (e.g., mobile computing device, personal computer, server, etc.) may be used for any of these components. Additionally, while each of these computing devices is illustrated in FIG. 1 as a single piece of hardware, this is also merely an example. More specifically, each of the user computing device 12a, server computing device 12b, and administrator computing device 12c may represent a plurality of computers, servers, databases, components, and/or the like.

Figure 2:
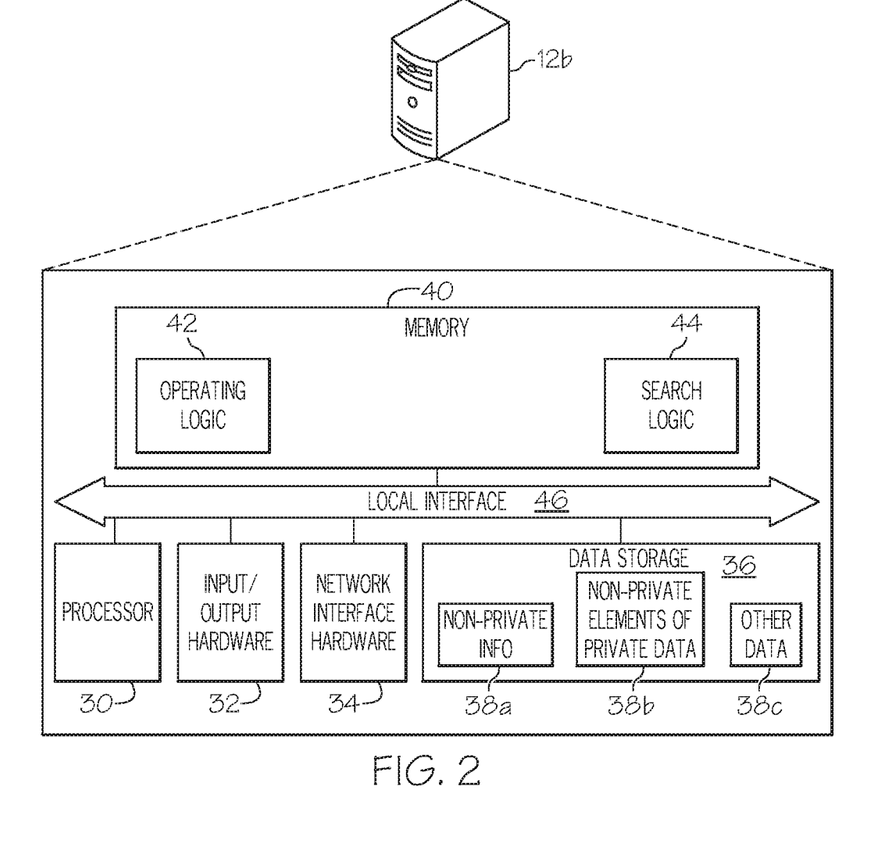
FIG. 2 depicts a schematic depiction of the server computing device from FIG. 1, further illustrating hardware and software that may be used in providing data according to one or more embodiments shown and described herein.

FIG. 2 depicts the server computing device 12b, from FIG. 1, further illustrating a system for determining non-private information, searching a document corpus, generating responses to questions presented by users, and/or generating auto-complete suggestions. In addition, the server computing device 12b may include a non-transitory computer-readable medium for searching a document corpus or generating search queries embodied as hardware, software, and/or firmware, according to embodiments shown and described herein. While in some embodiments the server computing device 12b may be configured as a general purpose computer with the requisite hardware, software, and/or firmware, in some embodiments, the server computing device 12b may also be configured as a special purpose computer designed specifically for performing the functionality described herein.

As also illustrated in FIG. 2, the server computing device 12b may include a processor 30, input/output hardware 32, network interface hardware 34, a data storage component 36 (which may store non-private information 38a, non-private elements of private data 38b, and other data 38c), and a non-transitory memory component 40. The memory component 40 may be configured as volatile and/or nonvolatile computer readable medium and, as such, may include random access memory (including SRAM, DRAM, and/or other types of random access memory), flash memory, registers, compact discs (CD), digital versatile discs (DVD), and/or other types of storage components. Additionally, the memory component 40 may be configured to store operating logic 42 and search logic 44 (each of which may be embodied as a computer program, firmware, or hardware, as an example). A local interface 46 is also included in FIG. 2 and may be implemented as a bus or other interface to facilitate communication among the components of the server computing device 12b.

The processor 30 may include any processing component configured to receive and execute instructions (such as from the data storage component 36 and/or memory component 40). The input/output hardware 32 may include a monitor, keyboard, mouse, printer, camera, microphone, speaker, touch-screen, and/or other device for receiving, sending, and/or presenting data. The network interface hardware 34 may include any wired or wireless networking hardware, such as a modem, LAN port, wireless fidelity (Wi-Fi) card, WiMax card, mobile communications hardware, and/or other hardware for communicating with other networks and/or devices.

It should be understood that the data storage component 36 may reside local to and/or remote from the server computing device 12b and may be configured to store one or more pieces of data and selectively provide access to the one or more pieces of data. As illustrated in FIG. 2, the data storage component 36 may store non-private information 38a, non-private elements of private data 38b, and other data 38c, as described in greater detail herein.

Included in the memory component 40 are the operating logic 42 and the search logic 44. The operating logic 42 may include an operating system and/or other software for managing components of the server computing device 12b. The search logic 44 may be configured to generate search queries from user-input within the graphical user interface, as described in detail below.

It should be understood that the components illustrated in FIG. 2 are merely illustrative and are not intended to limit the scope of this disclosure. More specifically, while the components in FIG. 2 are illustrated as residing within the server computing device 12*b*, this is a nonlimiting example. In some embodiments, one or more of the components may reside external to the server computing device 12*b*. Similarly, while FIG. 2 is directed to the server computing device 12*b*, other components such as the user computing device 12*a* and the administrator computing device 12*c* may include similar hardware, software, and/or firmware.

Figure 3:
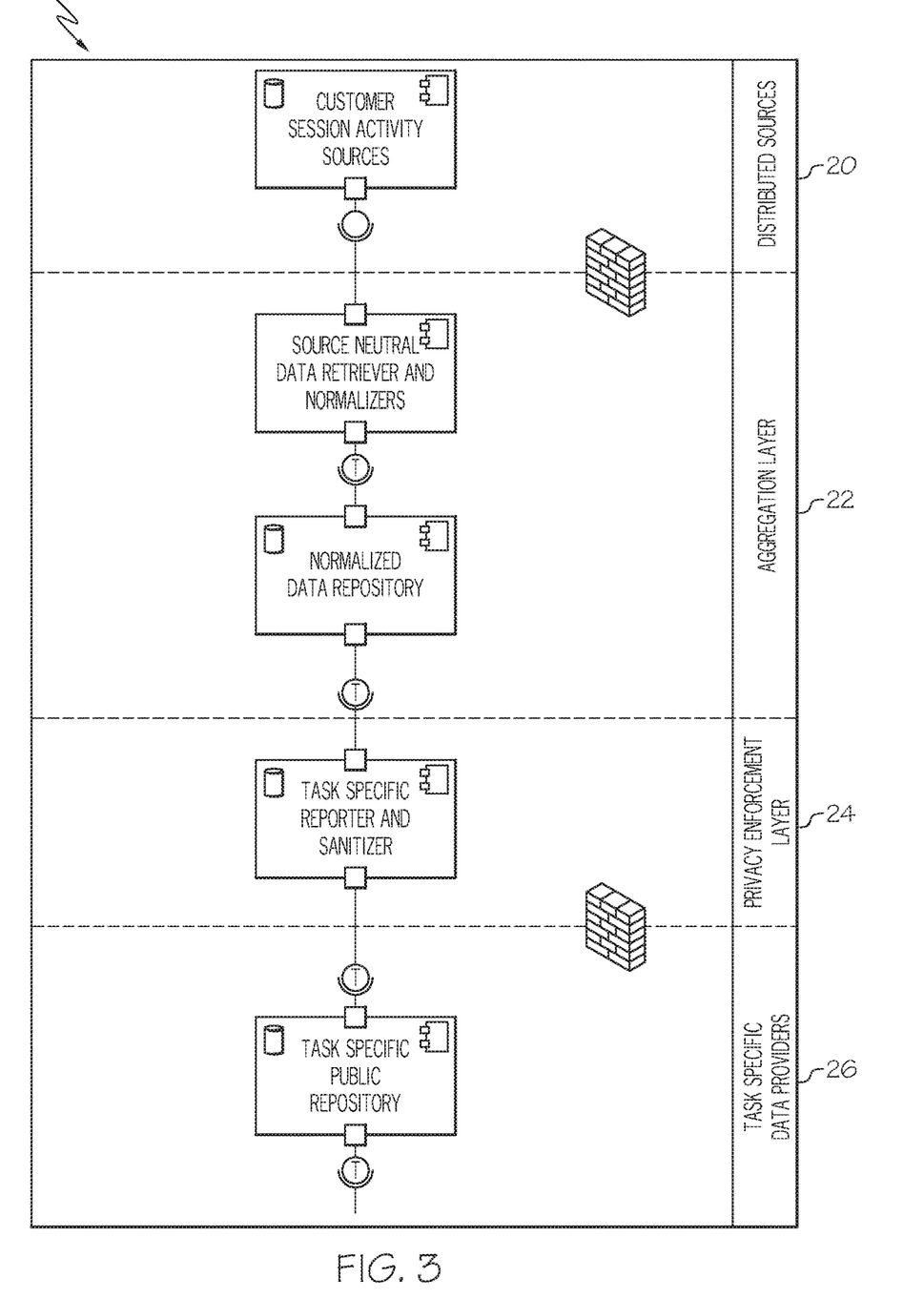
FIG. 3 depicts a schematic depiction of the various layers of the privacy firewall from FIG. 1 according to one or more embodiments shown and described herein.

FIG. 3 depicts various layers of the privacy firewall 14 from FIG. 1. The layers depicted in FIG. 3 are merely illustrative. Thus, fewer or additional layers may be used without departing from the scope of the present disclosure. In addition, certain layers may be collapsed or further stratified into additional layers. Each layer may represent an amount of access to the data contained within the server computing device 12*b* (FIG. 1) that is provided to an outside requester, such as, for example, a user of the user computing device 12*a* (FIG. 1). The access may generally be in the form of an answer to a question posed by a user or as an auto-complete suggestion, rather than direct access to the data. Illustrative layers may include, for example, a distributed sources layer 20, an aggregation layer 22, a privacy enforcement layer 24, and a task specific data provider layer 26. In some embodiments, the distributed sources layer 20, the aggregation layer 22, and the privacy enforcement layer 24 may be highly restrictive data layers where little or no data categorized by such layers is allowed to be accessed without tuning the data, as described in greater detail herein. In some embodiments, the task specific data provider layer 26 may be a low restrictive data layer where more or all of the data categorized by the layer is allowed to be accessed.

The distributed sources layer 20 may categorize data that is typically found in, for example, customer session activity sources. Such customer session activity sources may represent a plurality of sources present on a plurality of different platforms and/or applications from which data is received and stored. As a nonlimiting example, one source may be a search box of a particular program or application. Data from the different sources may be stored in different data repositories. Certain data repositories may have more data restrictions than other data repositories. As such, the data may not be normalized across the different repositories.

The aggregation layer 22 may categorize data that is typically found in, for example, normalized data repositories. That is, the data may have been obtained from various data repositories, each in a respective native format, and normalized by one or more normalization tools ("normalizers") into a single consistent format. In some embodiments, as the data is normalized, it may be anonymized as much as practical so that the amount of sensitive information contained in the data is minimized. However, in some embodiments, the repository may contain a common and consistent set of attributes that are sufficient for certain modules and a full anonymization may not be possible until a particular query is presented (i.e., a query that relates to the data). Thus, despite the anonymization, the data contained in the repository may still be highly sensitive. Accordingly, access to such data may be highly restricted.

The privacy enforcement layer 24 may categorize data that has been passed through a task specific reporter and sanitizer module. Such data may be, for example, normalized data which can contain sensitive information if a query is presented a certain way. For example, a privacy veil may be pierced by asking a plurality of questions in a plurality of different ways and using Boolean algebra operations to tease out more data than was intended to be exposed. Thus, it may be desirable to strictly limit the types of questions that can be asked to obtain certain information and also ensure the total variety of questions that are exposed cannot have their answers combined to leak information. Therefore, each query that is presented to the privacy firewall 14 may have a specific module created to deliver results. Each specific module may be vetted and built in a highly restricted environment such that the module acts as a bridge to translating sensitive data to non-sensitive data.

The task specific data provider layer 26 may generally include a task specific public repository of information that is generally non-private, desensitized private data, or non-private elements of private data. Such data may be used to answer a query.

Figure 4:
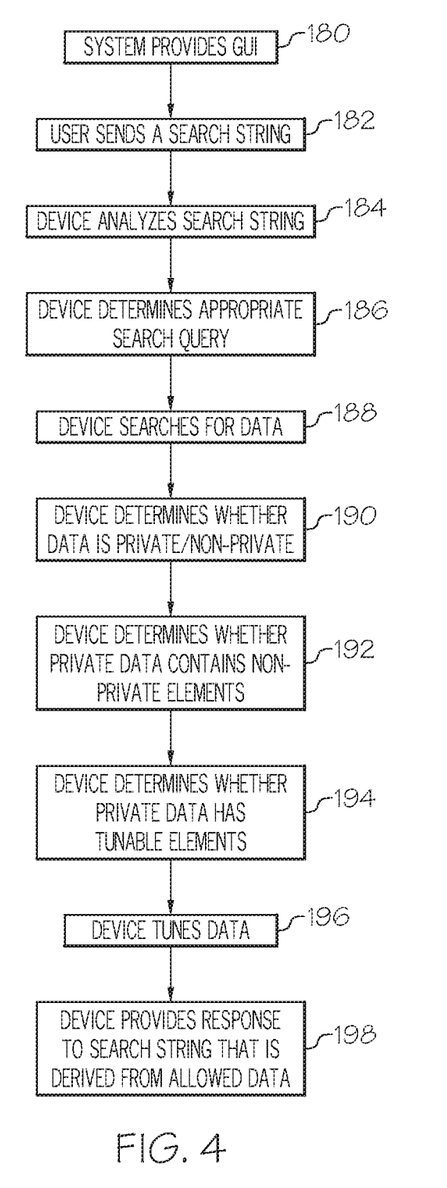
FIG. 4 depicts a flow diagram of an illustrative method of providing data in response to a request according to one or more embodiments shown and described herein.
Figure 5:
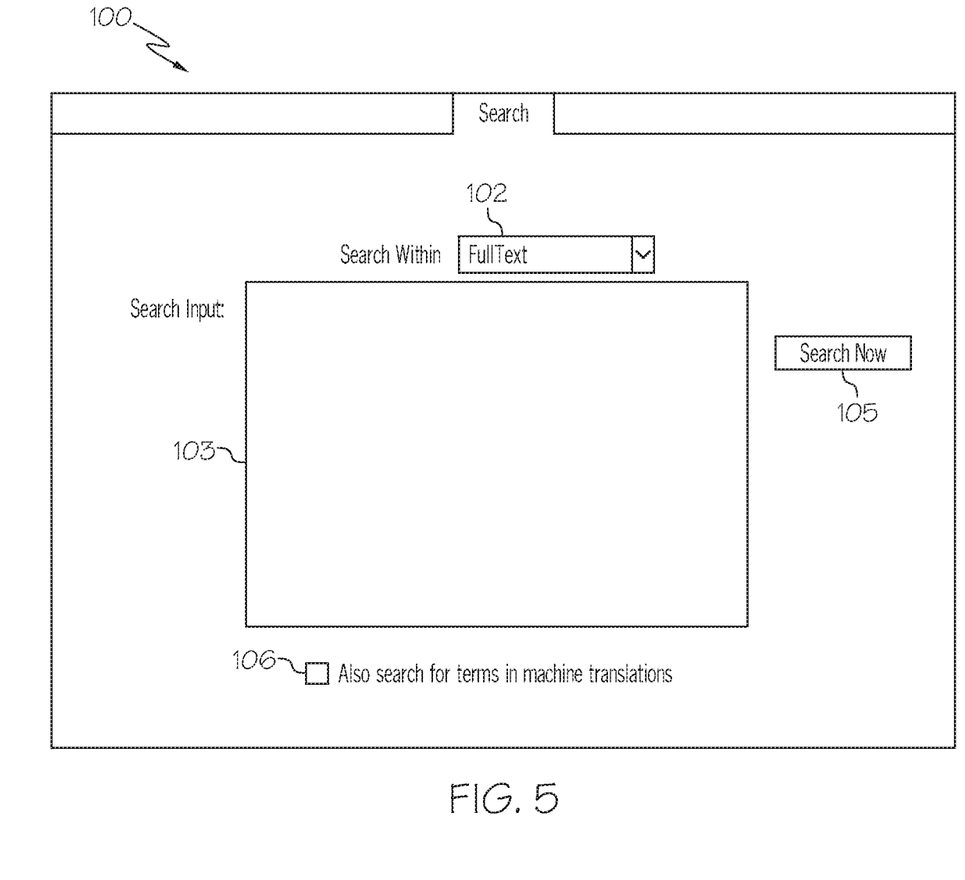
FIG. 5 depicts a schematic depiction of an illustrative search input screen of a graphical user interface according to one or more embodiments shown and described herein.

Referring now to FIG. 4, a flow diagram that illustrates a method of implementing a privacy firewall according to one or more embodiments is provided. As described in greater detail herein, embodiments may enable a user to request information and view non-private information and/or non-private elements of private data. At block 180, the system may generate a graphical user interface for display on a display device of the user computing device 12*a*. The graphical user interface is configured such that a user can send a search string at block 182. Referring to FIG. 5, the graphical user interface may comprise a search string input screen 100 that is configured to receive a search string from a user. It should be understood that embodiments are not limited to the configurations of the graphical user interfaces illustrated throughout the figures, and that other graphical user interface configurations are possible. In one embodiment, the network 10 is the Internet and the graphical user interfaces described herein are presented to the user via a web browser.

Figure 6:
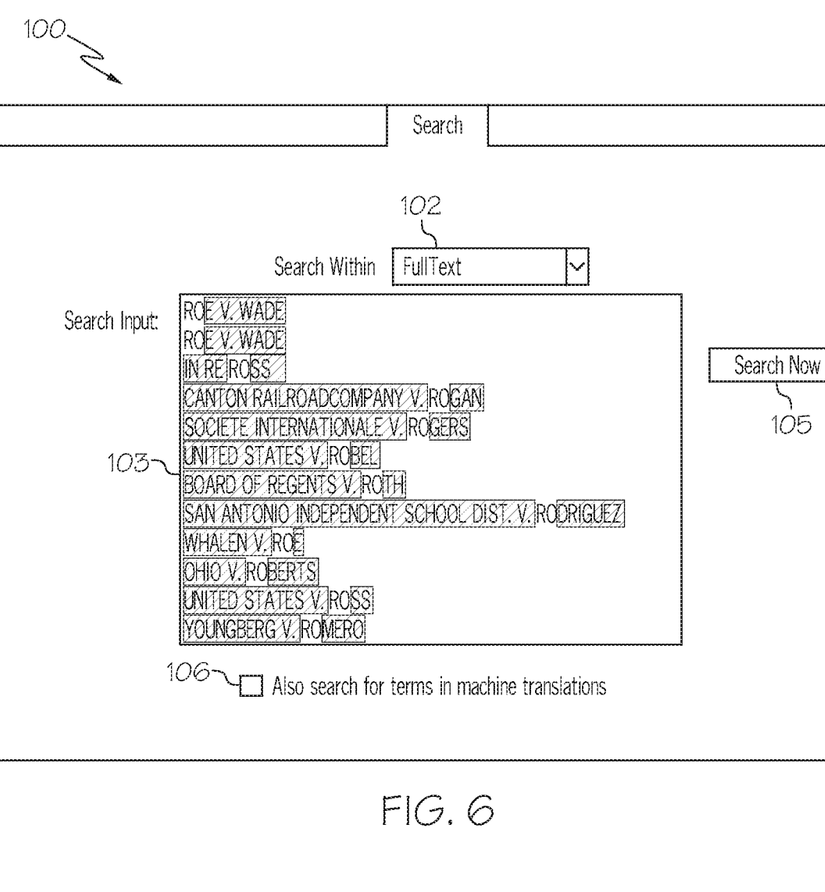
FIG. 6 depicts a schematic depiction of an illustrative search input screen of a graphical user interface containing auto-complete options according to one or more embodiments shown and described herein.

The search string input screen 100 comprises a search string field 103 into which a user may enter one or more terms that make up a desired search string (e.g., by the use of a keyboard). In one embodiment, the search string may be a natural language search string. For example, the user may ask a question, such as, for example, "what is the landmark case from the Supreme Court regarding abortions?" In another example, such as the embodiment illustrated in FIG. 5, the search string "Roe v. Wade" has been entered into the search string field 103, as the particular user may be interested in searching for information relating to the U.S. Supreme Court decision from 1973. As shown in FIG. 6, in some embodiments, the user may only need to enter one or more letters in the search string field 103, and the system may generate suggested auto-complete options based on data obtained from the private data repositories contained within the server computing device 12*b*. For example, if the user is searching a case law database, when the user types the letters "RO," certain auto complete options that contain the letters "RO" may be presented to the user, such as, for example, Roe v. Wade, In Re Ross, and/or the like, as shown below the user's input in the search string field 104. The auto-complete suggestions may be generated, for example, as a result of data indicating that many users have searched for those particular cases, which may optionally be ranked by popularity. Thus, the system may attempt to guess what a user might want to search for before the user has completed typing the search string based on the private data contained within the server computing device 12*b*. However, the information that is obtained to provide the autocomplete suggestions may generally be the non-private information and/or non-private elements of the private data such that terms that may breach one's privacy are not included in the auto complete options.

As shown in FIGS. 5 and 6, the search string input screen 100 may also include other input features, such as an option button 106, a section filter input 102, and a search initiation icon 105. It should be understood that more or fewer input features may be used. In the example illustrated in FIGS. 5 and 6, the option button 106 allows a user to also search machine translations of electronic data that is not in the native language of the corpus in which the user is searching. Other options may also be provided. The section filter input 102 may enable a user to only search particular sections or combinations of sections of the data. For example, in the case law context, the user may use the section filter input 102 to search only the case summary section, a keywords section, a judicial opinion section, a facts section, and/or the like.

The user may initiate a search based on the search string entered into the search string field 103 by clicking or otherwise selecting the search initiation icon 105. Individual terms of the search string are used as query terms to analyze the search string at block 184. Analyzing the search string may generally include determining what the user is searching for, which may be completed by any method now known or later developed. In some embodiments, an appropriate search query may be determined in block 186 based on the user's submitted search string. That is, the search string submitted by the user may be received and interpreted, and an appropriate search query may be generated based on the data to be accessed, the type of system containing the data, and/or the like. The appropriate search query may be generated using any number of query generation techniques. For example, a Boolean weighted search query may be generated based on the analysis of the search string submitted by the user.

In block 188, the data contained in a repository behind the firewall 14, such as in the server computing device 12b, may be searched. If data relating to the search query is discovered, the data may be analyzed to determine whether the data is private or non-private in step 190. In some embodiments, the private data may be further analyzed to determine whether it contains non-private elements in step 192. In addition, the private data may be analyzed to determine whether certain elements may be tuned to make those elements non-private elements in step 194. If the data can be tuned, such tuning may be completed in step 196 to obtained tuned data (which may also be referred to as depersonalized data). For example, the data may be tuned to adjust the granularity of a time and date stamp, adjust the granularity of a geographical location, and/or the like. In some embodiments, the granularity may be adjusted above a particular granularity threshold. A geographic granularity threshold may be, for example, between a state or province and a city (e.g., "above" the threshold may be granularity of a state, a province, a country, a region, or the like, and "below" the threshold may be additional detail such as city, street address, or the like). A time granularity threshold may be, for example, between an hour and a minute (e.g., time displayed in hours, days, weeks, months, and years may be "above" the threshold, whereas time displayed in minutes and seconds may be "below" the threshold). In some embodiments, steps 190, 192, 194, and 196 may be completed for each search query. In other embodiments, steps 190, 192, 194, and 196 may be completed as soon as data is obtained in the repository so as to allow the searching in step 188 to be quickly completed.

The query terms of the search query are used to search the corpus of data to provide a response to the search string in step 198. The response is generally derived from the non-private information and/or the non-private elements of the private data, including the tuned portions of the private data (if any). The response may be a natural language answer that responds to the question asked by the user, one or more links to particular references, a set of returned electronic documents for display, and/or the like.

Referring again to FIG. 1, in various embodiments, the server computing device 12b may continue to gather new data as it is generated and/or made available. The new data may be analyzed such that a determination can be made as to whether the data contains private or sensitive data such that private or sensitive information is not allowed past the firewall 14, as described herein. Thus, a process for analyzing and categorizing the data is depicted in FIG. 7.

Figure 7:
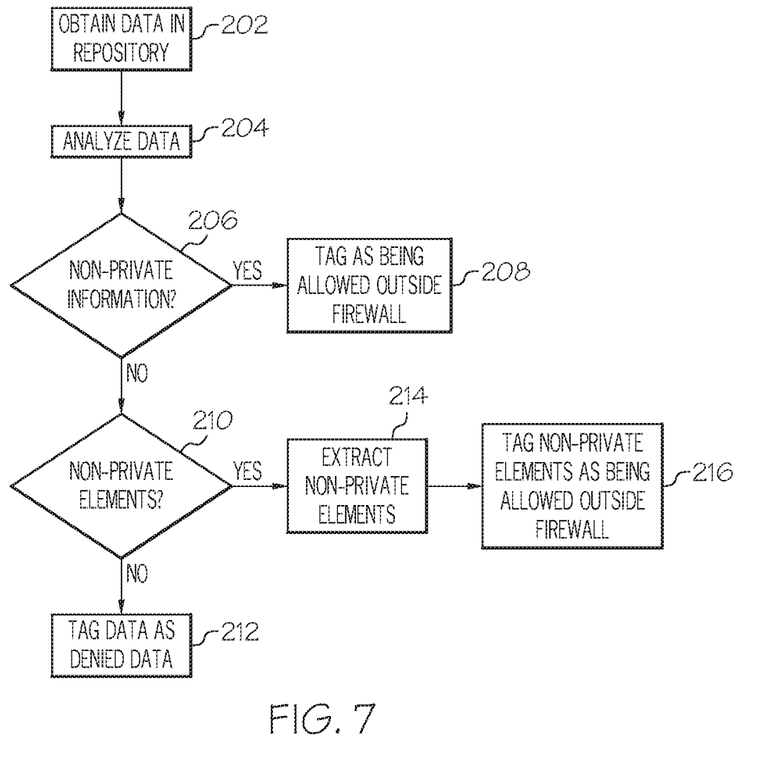
FIG. 7 depicts a flow diagram of an illustrative method of analyzing and categorizing data according to one or more embodiments shown and described herein.

As shown in FIG. 7, and also referring to FIG. 1, the data may be obtained from a repository in step 202. For example, in some embodiments, the data may be copied or moved from a remote repository to the server computing device 12b behind the firewall 14. In other embodiments, the repository may be located within the server computing device 12b (e.g., in the data storage 36 (FIG. 2)) or otherwise behind the firewall 14, thereby making a copy or a transfer unnecessary.

As described herein, the data may initially be presumed to be private data. In step 204, the data may be analyzed to determine in step 206 whether the data contains non-private information. If the data does not contain any portion that could be private, the data may be identified as non-private information and may be tagged as allowed for use outside the privacy firewall 14 in step 208. For example, if the data entirely contains publicly available information such as unsealed court records, publicly-available real estate records, and/or the like, the data may be determined in step 206 to not contain private data and tagged as allowed for use outside the privacy firewall 14 in step 208.

On the other hand, if any portion of the data contains information that is sensitive, private, or could be viewed as sensitive or private, the data may continue to be identified as private data. For example, if the data contains court records, but the court records contain private information such as an individual's home address, the data may be identified as private data.

Figure 8:
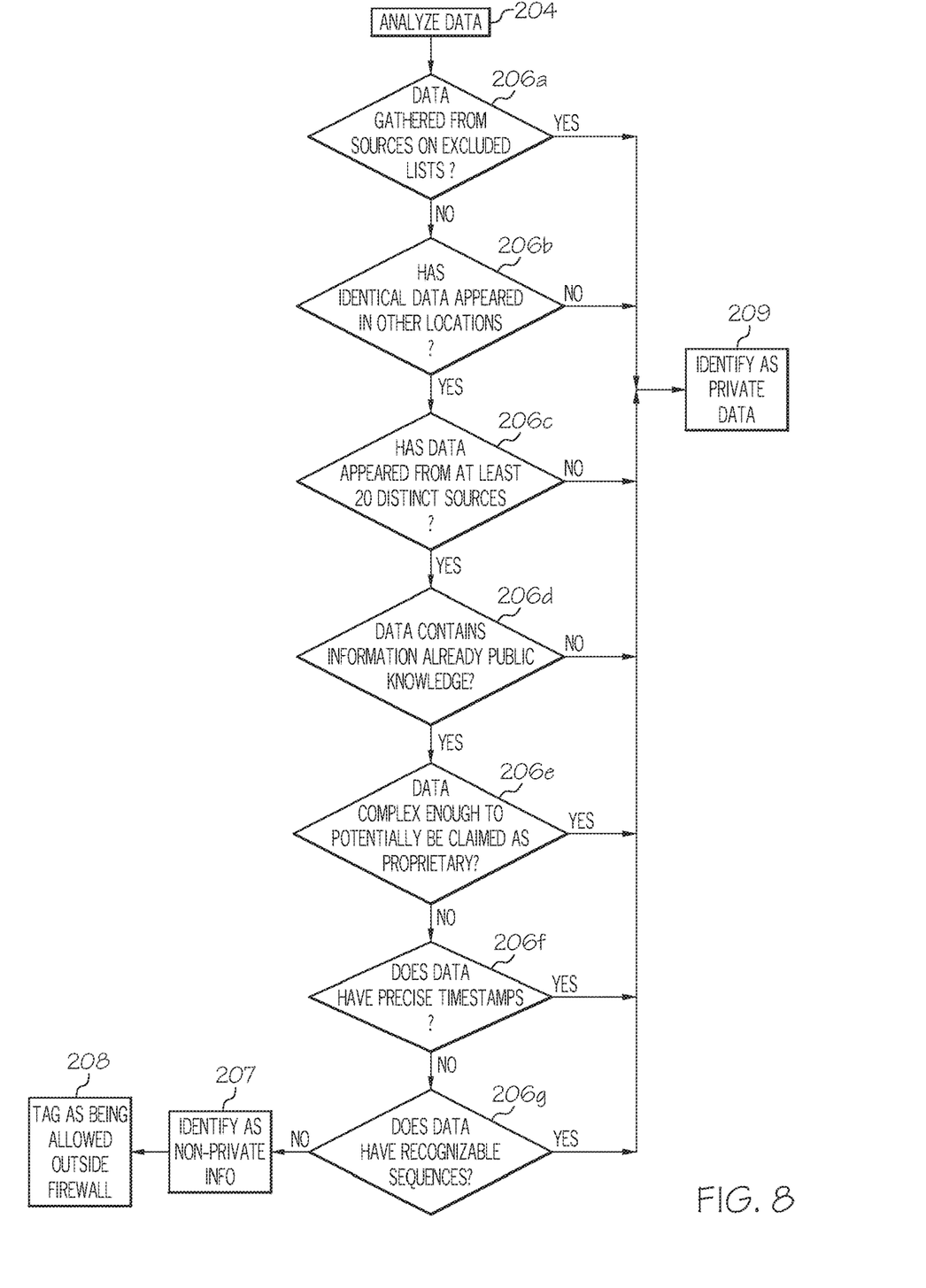
FIG. 8 depicts a flow diagram of an illustrative method of determining whether private data contains non-private information according to one or more embodiments shown and described herein.

As shown in FIG. 8, the determination of whether the data contains non-private information may include a plurality of determination steps. Such steps are merely illustrative, and it should be understood that alternative, additional, or fewer steps may be completed without departing from the scope of the present disclosure. Further, it should be understood that embodiments are not limited by this order of steps as shown in FIG. 8. One illustrative step, as shown in step 206a, a determination may be made as to whether the data was gathered from a source that is on an excluded list. Illustrative excluded lists may include, for example, lists containing information designated private per HIPAA, the Healthcare Interoperability Testing and Conformance Harmonisation (HITCH) project, the Driver's Privacy Protection Act (DPPA), the Gramm-Leach-Bliley Act (GLBA) (also known as the Financial Services Modernization Act of 1999), the Payment Card Industry Data Security Standard (PCI DSS), and/or the like. If the data is gathered from sources on an excluded list, the data may be identified as private in step 209. If the data is not gathered from sources on an excluded list, additional determination steps may be completed or the data may be identified as containing non-private information in step 207 and tagged as being allowed for use outside the privacy firewall in step 208.

In illustrative step 206b, a determination may be made as to whether identical data has appeared in other locations. For example, if data is gathered regarding a particular search string that was entered at a search engine interface, the determination in step 206b may look to see if that same search string was entered from another location. Locations may be determined by reviewing metadata or the like. For example, the metadata regarding a particular search query may include the IP address of the device used to enter the search string in the search engine interface. If an identical search query was entered by different IP addresses, and such IP addresses constitute different locations (i.e., not IP addresses originating from the same physical location), it may be determined that the data has appeared in other locations. If the data has not appeared in other locations, the data may be identified as private in step 209. If the data has appeared in other locations, additional determination steps may be completed or the data may be identified as containing non-private information in step 207 and tagged as being allowed for use outside the privacy firewall in step 208.

In illustrative step 206c, a determination may be made as to whether the data has been obtained from at least 20 distinct sources. For example, if the data contains metadata indicative of a source of the data (e.g., an IP address or the like), the determination may include reviewing the metadata to ensure that the data was obtained from 20 distinct sources. It should be understood that the number of sources used herein (20) is merely illustrative, and that any number of sources may be specified, particularly a number of sources that ensures that the date is not private. For example, the number of sources may vary based on the type of data, certain rules or policies regarding the data, and/or the like. If the data has not appeared from at least 20 distinct sources, the data may be identified as private in step 209. If the data has appeared from at least 20 distinct sources, additional determination steps may be completed or the data may be identified as containing non-private information in step 207 and tagged as being allowed for use outside the privacy firewall in step 208.

In illustrative step 206d, a determination may be made as to whether the data contains information that is already public knowledge. For example, if the data contains information that would ordinarily be private, such as an individual's home address, but the individual has publicly broadcasted his home address to advertise a business that he operates out of his home, such information may be considered to be already public knowledge. If the data contains information that is not already public knowledge, the data may be identified as private in step 209. If the data contains information that is already public knowledge, additional determination steps may be completed or the data may be identified as containing non-private information in step 207 and tagged as being allowed for use outside the privacy firewall in step 208.

In illustrative step 206e, a determination may be made as to whether the data is complex enough to be claimed as proprietary. The complexity of the data may be made on a case-by-case basis that is based on the nature of the data, the nature of the sources of the data, the context within which the data was gathered, and any agreements made with a provider of the data (e.g., a terms of use agreement). For example, if an entity develops a complex algorithm that could be claimed as proprietary (such as, for example, a trade secret) and the algorithm appears in the data, at least the portion of the data containing the algorithm may be considered private. In another example, if an entity enters a search string that is very narrowly construed and/or unique, the search string may be considered complex. Accordingly, if the data is determined to be complex enough to be claimed as proprietary, the data may be identified as private data in step 209. If the data is not complex enough to be claimed as proprietary, additional determination steps may be completed or the data may be identified as containing non-private information in step 207 and tagged as being allowed for use outside the privacy firewall in step 208.

In illustrative step 206f, a determination may be made as to whether the data contains precise timestamps. For example, if the data relates to search strings having precise timestamps that may allow one to identify the individual or entity that conducted the search, the data may be private. Unless the data is appropriately tuned to adjust the granularity of the timestamp (e.g., no more specific than the hour the search string was inputted) as described herein, the data may be identified as private in step 209. If the data does not contain precise timestamps, or if it has been appropriately tuned, additional determination steps may be completed or the data may be identified as containing non-private information in step 207 and tagged as being allowed for use outside the privacy firewall in step 208.

In illustrative step 206g, a determination may be made as to whether the data contains recognizable sequences. A recognizable sequence may generally be a sequence of data strings that, when observed together, contain information that should be private, even if the data strings standing alone would not be considered private. For example, if the data contains a sequence that might allow one to determine the individual entity or data associated with the data, such data may be identified as private data in step 209. In another example, if an entity conducts 4 subsequent searches using the terms "favorable courts for manufacturing-based class action lawsuits," "companies making scraper widgets," "companies in the state of Connecticut," and "individuals admitted to emergency rooms in Connecticut for cuts," it may be deduced that the entity is an attorney or law firm considering filing a class-action lawsuit against scraper widget makers in Connecticut, which may constitute private information even though the search strings, taken individually, would not reveal such information and may not be private. If the data does not contain any sequences that may be used to identify the individual or entity associated with the data, additional determination steps may be completed or the data may be identified as containing non-private information in step 207 and tagged as being allowed for use outside the privacy firewall in step 208.

Referring again to FIG. 7, in step 210, a determination may be made as to whether the private data contains non-private elements. That is, if the private data has certain portions that, when standing alone, would constitute non-private information, such private data is identified as containing private portions and the non-private elements may be extracted therefrom in step 214. As previously described herein, the non-private elements may be extracted in such a way that private information may not be gleaned from the non-private elements. For example, if the non-private element is metadata that can be extracted from the private data, such metadata must be restricted in scope (e.g., a geographic location of a user may not be any more specific than the state, territory, province, etc. in which the user is located). The non-private elements upon being extracted, may be tagged as being allowed for use outside the privacy firewall 14 in step 216. If the data does not contain non-private elements, the data may be tagged in step 212 as being denied data to which access is not provided through the privacy firewall 14.

It should be understood that embodiments described herein provide for systems and methods for providing a privacy firewall that allows access to private data without breaching the privacy of an individual or entity that generated the data. The nature of the systems and methods herein allow a user to ask a question or type a search string that may require private data access to obtain an answer. The user may then receive a response to the question or may be provided with auto-complete suggestions without ever obtaining access to private data repositories.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for implementing a privacy firewall to selectively restrict access to private electronic data, the system comprising:
   a data storage repository comprising a corpus of the private electronic data located behind the privacy firewall, the corpus of the private electronic data comprising non-private information and private information;
   a processing device; and
   a non-transitory, processor-readable storage medium, wherein the non-transitory, processor-readable storage medium comprises one or more programming instructions that, when executed, cause the processing device to:
      receive a query from a remote computer, the query comprising a request to access one or more portions of the corpus of private electronic data;
      analyze the corpus of private electronic data behind the privacy firewall to identify the non-private information and the private information, the analyzing comprising:
         determining whether the corpus of private electronic data was obtained from sources on an excluded list, and
         if the corpus of private electronic data was obtained from sources on the excluded list, tag the corpus of private electronic data as denied for use outside the privacy firewall;
      tag the non-private information as allowed for use outside the privacy firewall;
      determine that the private information comprises non-private elements, wherein the non-private elements are portions of the private information or additional data that is derived from the private information that are not private;
      extract the non-private elements from the private information, wherein a remainder of the private information is unextracted;
      tag the non-private elements as information allowed for use outside the privacy firewall;
      tag the unextracted elements as denied for use outside the privacy firewall; and
      provide one or more of the non-private information and the non-private elements of the private information to the remote computer located outside of the privacy firewall.

2. The system of claim 1, wherein the one or more programming instructions that, when executed, cause the processing device to determine that the private information comprises non-private elements further cause the processing device to:
   determine whether the private information comprises one or more elements that have appeared in other locations; and
   if the one or more elements have appeared in other locations, tag the one or more elements as non-private elements.

3. The system of claim 1, wherein the one or more programming instructions that, when executed, cause the processing device to determine that the private information comprises non-private elements further cause the processing device to:
   determine whether the private information comprises one or more elements that have appeared from a threshold number of distinct sources; and
   if the one or more elements have appeared from at least the threshold number of distinct sources, tag the one or more elements as non-private elements.

4. The system of claim 1, wherein the one or more programming instructions that, when executed, cause the processing device to determine the private information comprises non-private elements further cause the processing device to:
   determine whether the private information comprises one or more elements that contain information that is already public knowledge; and
   if the one or more elements contain information that is already public knowledge, tag the one or more elements as non-private elements.

5. The system of claim 1, wherein the one or more programming instructions that, when executed, cause the processing device to determine that the private information comprises non-private elements further cause the processing device to:
   determine whether the private information comprises one or more elements that are complex such that the one or elements are claimable as proprietary information; and
   if the one or more elements are complex, tag the one or more elements as denied for use outside the privacy firewall.

6. The system of claim 1, wherein the one or more programming instructions that, when executed, cause the processing device to determine that the private information comprises non-private elements further cause the processing device to:
   determine whether the private information comprises one or more sub-portions that have recognizable sequences; and
   if the one or more sub-portions have recognizable sequences, tag the one or more sub-portions as denied for distribution outside the privacy firewall.

7. The system of claim 1, wherein the one or more programming instructions that, when executed, cause the processing device to determine that the private information comprises non-private elements further cause the processing device to:
   determine whether the private information comprises one or more elements that have precise timestamps; and if the one or more elements have precise timestamps, tag the one or more elements as denied for use outside the privacy firewall.

8. The system of claim 1, wherein the one or more programming instructions that, when executed, cause the processing device to determine that the private information comprises non-private elements further cause the processing device to:
   determine whether the private information comprises one or more elements that have a geographic location that is below a granularity threshold; and
   if the geographic location is below the granularity threshold:
      tune the one or more elements to a geographic location above the granularity threshold, and
      tag the one or more tuned elements as non-private elements.

9. The system of claim 1, wherein the one or more programming instructions that, when executed, cause the processing device to provide the one or more of the non-private information and the non-private elements of the private information to the remote computer further cause the processing device to:
   provide a response to the query to a user via a user interface, wherein the response to the query contains information obtained from one or more of the non-private information and the non-private elements of the private information.

10. A method for implementing a privacy firewall to selectively restrict access to private electronic data, the method comprising:
   receiving a query from a remote computer, the query comprising a request to access one or more portions of a corpus of private electronic data, the corpus of the private electronic data comprising non-private information and private information;
   analyzing, by a processing device, the corpus of private electronic data to identify the non-private information and the private information, the analyzing comprising:
      determining whether the corpus of private electronic data was obtained from sources on an excluded list, and
      if the corpus of private electronic data was obtained from sources on the excluded list, tag the corpus of private electronic data as denied for use outside the privacy firewall;
   tagging, by the processing device, the non-private information as allowed for use outside the privacy firewall;
   determining, by the processing device, that the private information comprises non-private elements, wherein the non-private elements are portions of the private information or additional data that is derived from the private information that are not private;
   extracting, by the processing device, the non-private elements from the private information, wherein a remainder of the private information is unextracted;
   tagging, by the processing device, the non-private elements as information allowed for use outside the privacy firewall;
   tagging, by the processing device, the unextracted elements as denied for use outside the privacy firewall; and
   providing, by the processing device, one or more of the non-private information and the non-private elements of the private information to the remote computer located outside of the privacy firewall.

11. The method of claim 10, wherein determining that the private information comprises non-private elements comprises:
   determining, by the processing device, whether the private information comprises one or more elements that have appeared in other locations; and
   if the one or more elements have appeared in other locations, tagging, by the processing device, the one or more elements as non-private elements.

12. The method of claim 10, wherein determining that the private information comprises non-private elements comprises:
   determining, by the processing device, whether the private information comprises one or more elements that have appeared from a threshold number of distinct sources; and
   if the one or more elements have appeared from at least the threshold number of distinct sources, tagging, by the processing device, the one or more elements as non-private elements.

13. The method of claim 10, wherein determining that the private information comprises non-private elements comprises:
   determining, by the processing device, whether the private information comprises one or more elements that contain information that is already public knowledge; and
   if the one or more elements contain information that is already public knowledge, tagging, by the processing device, the one or more elements as non-private elements.

14. The method of claim 10, wherein determining that the private information comprises non-private elements comprises:
   determining, by the processing device, whether the private information comprises one or more elements that are complex such that the one or elements are claimable as proprietary information; and
   if the one or more elements are complex, tagging, by the processing device, the one or more elements as denied for use outside the privacy firewall.

15. The method of claim 10, wherein determining that the private information comprises non-private elements comprises:
   determining, by the processing device, whether the private information comprises one or more sub-portions that have recognizable sequences; and
   if the one or more sub-portions have recognizable sequences, tagging, by the processing device, the one or more sub-portions as denied for distribution outside the privacy firewall.

16. The method of claim 10, wherein determining that the private information comprises non-private elements comprises:
   determining, by the processing device, whether the private information comprises one or more elements that have a geographic location that is below a granularity threshold; and
   if the geographic location is below the granularity threshold:
      tuning, by the processing device, the one or more elements to a geographic location above the granularity threshold, and
      tagging, by the processing device, the one or more tuned elements as non-private elements.

17. The method of claim 10, wherein providing the one or more of the non-private information and the non-private elements of the private information to the remote computer comprises:
provide, by the processing device, a response to the query to a user via a user interface, wherein the response to the query contains information obtained from one or more of the non-private information and the non-private elements of the private information.

18. A system for implementing a privacy firewall to selectively restrict access to private electronic data, the system comprising:
a data storage repository behind the privacy firewall, the data storage repository comprising a corpus of private electronic data that has been tagged as non-private information, private information not to be distributed, non-private elements of private information to be distributed, or depersonalized private information, wherein the non-private elements are portions of the private information or additional data that is derived from the private information that are not private;
a processing device; and
a non-transitory, processor-readable storage medium, wherein the non-transitory, processor-readable storage medium comprises one or more programming instructions that, when executed, cause the processing device to:
receive a search string from a remote computer located outside the privacy firewall, wherein the search string comprises a question;
search the data storage repository for one or more portions of the private electronic data that correspond to the search string;
if the one or more portions of the electronic data contain the non-private information, non-private elements of the private information to be distributed, or the depersonalized private information, provide a response to the remote computer, wherein the response contains information contained within the one or more portions of the electronic data contain the non-private information, the non-private elements of the private information to be distributed, or the depersonalized private information; and
tagging a remainder of the private information that is not the non-private information, non-private elements of the private information to be distributed, or the depersonalized private information as denied for use,
wherein, if the one or more portions of the private electronic data is obtained from sources on excluded list, the one or more portions of data are tamed as denied for use.

* * * * *

UNITED STATES PATENT AND TRADEMARK OFFICE
CERTIFICATE OF CORRECTION

PATENT NO. : 10,897,452 B2
APPLICATION NO. : 16/403903
DATED : January 19, 2021
INVENTOR(S) : William Kilgallon Page 1 of 1

It is certified that error appears in the above-identified patent and that said Letters Patent is hereby corrected as shown below:

In the Claims

In Column 18, Claim 18, Line 24, delete "tamed" and insert --tagged--, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*